United States Patent [19]

Maag et al.

[11] Patent Number: 4,756,404
[45] Date of Patent: * Jul. 12, 1988

[54] FLIGHT CONVEYOR

[75] Inventors: Wilhelm Maag; Paul Straub, both of Oberuzwil, Switzerland

[73] Assignee: Gebrueder Buehler AB, Uzwil, Switzerland

[*] Notice: The portion of the term of this patent subsequent to Mar. 4, 2003 has been disclaimed.

[21] Appl. No.: 770,230

[22] Filed: Aug. 27, 1985

Related U.S. Application Data

[63] Continuation-in-part of Ser. No. 506,723, Jun. 22, 1983, Pat. No. 4,573,568.

[30] Foreign Application Priority Data

Jul. 22, 1982 [CH] Switzerland ............... 4480/82

[51] Int. Cl.4 ............................................. B65G 19/24
[52] U.S. Cl. ..................................... 198/731; 198/733
[58] Field of Search .............. 198/731, 733, 716, 721, 198/727, 734, 730

[56] References Cited

U.S. PATENT DOCUMENTS

| | | | |
|---|---|---|---|
| 1,373,010 | 3/1921 | Lomando | 198/730 |
| 1,850,686 | 3/1932 | Pangborn | 198/731 |
| 2,279,862 | 4/1942 | Sinden | 198/716 |
| 2,667,263 | 1/1954 | Bigler . | |
| 2,761,548 | 9/1956 | Long . | |
| 2,779,454 | 1/1957 | Sigardson | 198/733 |
| 2,944,657 | 7/1960 | Davis et al. | 198/713 |
| 3,130,708 | 4/1964 | MacKenzie | 222/310 |
| 3,147,850 | 10/1964 | Ronceray | 198/716 |
| 3,225,897 | 12/1965 | Rollins . | |
| 4,238,028 | 12/1980 | Lake | 198/733 |
| 4,441,605 | 4/1984 | Ronco et al. | 198/733 |
| 4,466,532 | 8/1984 | Minneman et al. | 198/731 |
| 4,573,568 | 3/1986 | Maag et al. | 198/731 |

FOREIGN PATENT DOCUMENTS

| | | |
|---|---|---|
| 678982 | 1/1964 | Canada . |
| 0099481 | 2/1984 | European Pat. Off. . |
| 559878 | 9/1931 | Fed. Rep. of Germany . |
| 551088 | 5/1932 | Fed. Rep. of Germany . |
| 848029 | 7/1949 | Fed. Rep. of Germany . |
| 838123 | 5/1952 | Fed. Rep. of Germany . |
| 1907375 | 12/1964 | Fed. Rep. of Germany . |
| 3001228 | 1/1979 | Fed. Rep. of Germany . |
| 2939283 | 4/1981 | Fed. Rep. of Germany ...... 198/734 |
| 2312429 | 12/1964 | France . |
| 2294948 | 7/1976 | France ............... 198/730 |
| 2466411 | 4/1981 | France . |
| 415063 | 8/1934 | United Kingdom ............ 198/716 |
| 421844 | 1/1985 | United Kingdom . |

OTHER PUBLICATIONS

A photocopy of a page from a brochure from Rexnord.

Primary Examiner—Joseph E. Valenza
Assistant Examiner—Jonathan D. Holmes
Attorney, Agent, or Firm—Merchant, Gould, Smith, Edell, Welter & Schmidt

[57] ABSTRACT

A chain for a trough conveyor includes individual chain links connected with each other by hinge bolts. Removable flight attachment members, which may be flat or curved, connected with each other by at least one cross piece are provided on both sides of the chain links. Two bearing blocks are provided, each with a bore for receiving the hinge bolt. The cross piece rests on the trough by way of a rest surface. At least one support surface disposed in relation to the cross piece in the direction of the chain serves for preventing the tipping of the flight attachment arms when under the action of operating forces. An alternative embodiment includes a dual U-shaped frame about a frame of bearing blocks and cross pieces.

10 Claims, 5 Drawing Sheets

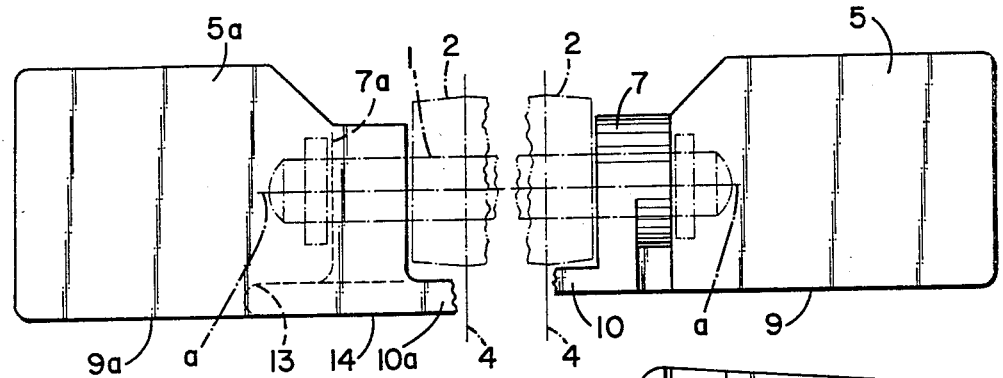
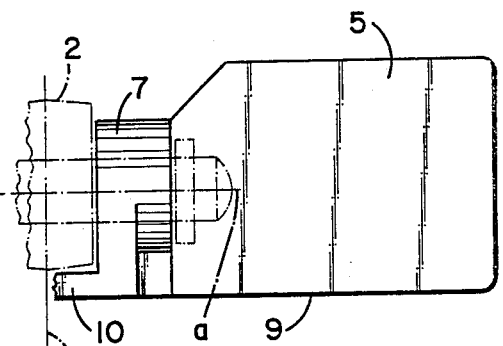
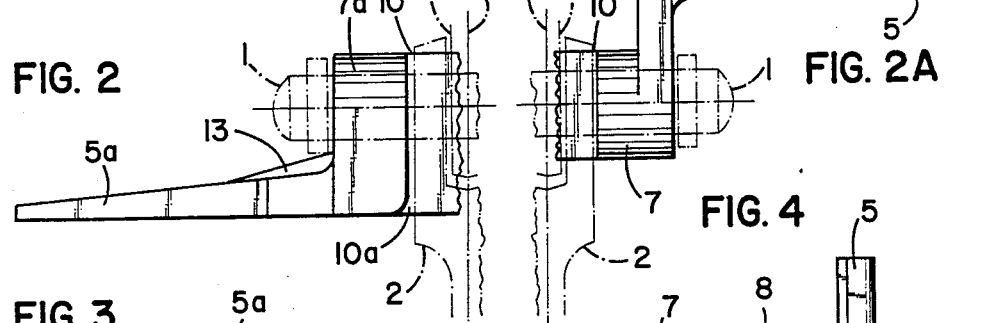
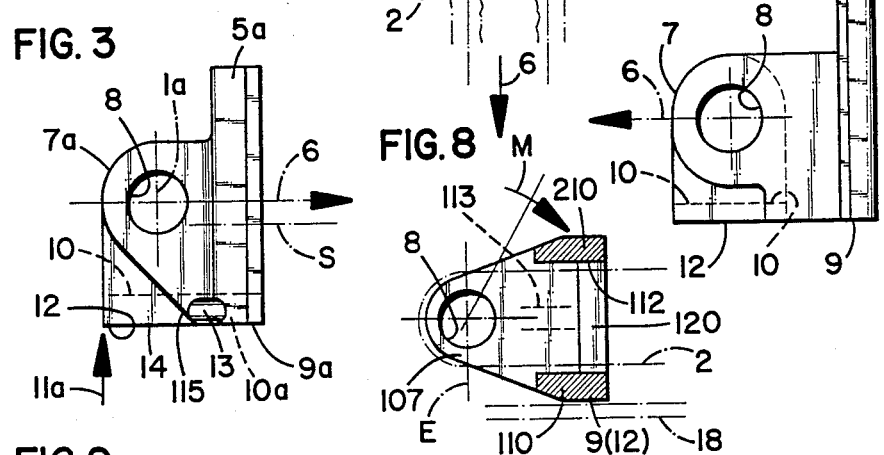
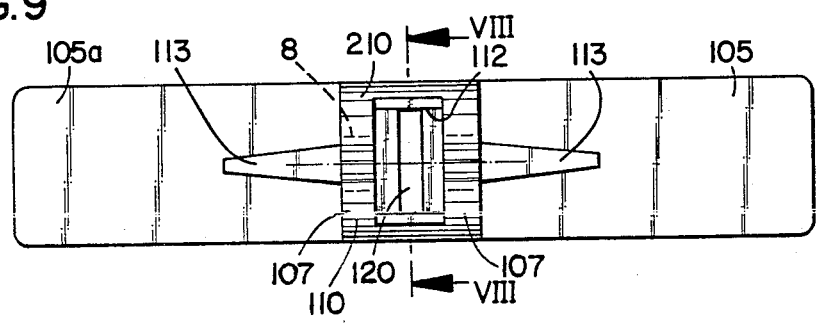

FLIGHT CONVEYOR

CROSS REFERENCE

This application is a continuation-in-part of U.S. Ser. No. 506,723 filed June 22, 1983 now U.S. Pat. No. 4,573,568 entitled "A Chain For a Flight Conveyor".

TECHNICAL FIELD

The invention relates to flights for a conveyor.

BACKGROUND OF THE INVENTION

The invention refers to a chain for a flight conveyor, the chain consisting of individual chain links connected with each other by means of hinge bolts, a flight attachment being fixedly arranged on the two sides of the chain links and disposed at least in part in a plane parallel to the respective hinge bolt, said flight attachment being provided with a rest surface for engaging the covneyor trough and connected with another flight attachment by way of a cross piece bridging the chain.

An important problem arising in connection with flight conveyors relates to the wear of the conveyor trough itself. This wear is not uniformly distributed over the entire length of the trough, but tends to arise at particular locations more intensely such as in curved areas. As soon as this wear has attained at these locations its maximum allowable limits, the entire trough must be replaced because of the few places showing too much wear. This causes appreciable costs, on the one hand, and increased down-time, on the other.

It has been proposed in the past (see German Pat. No. 848,029) for this reason to design the product in individual sections connected with each other, so that wear in any one location would require only one section to be replaced, thus to save money and time. However, this approach did not solve the basic problem of wear.

Other proposals aiming at building the trough at least in part of wear resistant synthetic plastics, such as polyethylene, got closer to be desired results (see U.S. Pat. No. 3,130,708) . However, the individual sections of a trough cannot be made too small for reasons of stability. Thus, the problem under discussion failed to get resolved, since the wear at a single location would require a relatively large section to be replaced. Furthermore, such large sections cannot be made of a plastic material, and in particular so polyethylene, in a simple and low cost process, such as molding.

It has been proposed for belt conveyors to vulcanize flight attachments made of rubber onto the belt (see U.S. Pat. No. 3,147,850). This form of connection evidently is not feasible in the case of chain conveyors. On the other hand, U.S. Pat. No. 2,779,454 discloses chain links provided with reinforcing discs facing each other and having a plastic ring fixedly held therebetween and serving as sealing ring with respect to the trough wall. These sealing rings were made to protrude only a small amount beyond the discs that held them, so that they had to be replaced after a comparatively short time of operation. Otherwise, said discs would abrade past the trough.

In another method, the problem of wear was to be solved by means of relatively small dimensioned plastics parts manufacturable at low cost. A design having flight attachments of metal provided with shoes of a plastic material has actually been put on the market and proved commercially successful. This solution, however, implied extra effort and expenditures. In addition to the customary flight attachments made of metal, it was necessary to fabricate and mount the plastics shoes in separate operations.

For this reason a new attempt to solve the above problem was made of late. More specifically, a new conveyor chain was put on the market, provided with lateral flight attachments fully made of plastics and fixedly screwed onto the chain fork. For this purpose the flights attachments were each provided with a sharply bent foot having bores penetrated by a pair of fastening screws screwed into threaded holes of the chain fork. Polyethylene was used here too as synthetic plastic. In addition to providing for low friction, this solution offered the advantage of lower chain weight. However, the chain links were made weaker by the threaded holes exactly in a location in which they were particularly stressed. As a consequence, this weakening effect had to be compensated for by overdimensioning the chain links, which more than offset the advantages referred to above. In addition, the sharply bent and relatively short foot ended up being subjected to relatively large torsional moments and stresses readily causing failures in operation.

SUMMARY OF THE INVENTION

The invention aims at creating a trough conveyor chain comprising chain links on which flight attachment of a plastic material may be readily mounted, with no disadvantages to occur in regard to the strength of the chain links and/or the flight attachments. This object is achieved according to the invention by the combination of the following features:

(a) said rest surface is formed on said cross piece itself, and (b) at least one support surface on said flight attachment is arranged spaced from a plane going through said hinge bolt and normal to the direction of said chain for absorbing any moments acting on said flight attachments mounted by way of said hinge bolt means.

The invention starts out from a known design of a flight attachment made of metal, in which the flight attachment was mounted by way of the hinge bolt of the chain links. However, if the rest surface is now formed by the cross piece of the flight attachment itself and said flight attachment is subject to moments, measure must be taken to prevent the flight attachment from rotating around the pivot under its load and thus lose its conveying effect. This danger is met by the feature b. Thus, whatever the material the flight attachments are made of, the following advantages occur;

(a) a distribution over a greater length of the stresses in the flight attachments;

(b) a simpler method of assembly for the flight attachments and the chain links in a single pass, without having to weaken the chain links by additional holes or bores.

Particular advantages result, however, from manufacturing the flight attachments of plastics, thus yielding a low-friction design. This design assures minimum wear, even though at least one part of the flight attachment, i.e. of its cross piece, bears against the conveyor trough. Such is the case, in particular, if according to a preferred design the cross piece and the flight attachments comprise at least some rest surfaces distributed over the entire bearing width, and if the cross piece and the flight attachments preferably comprise rest surfaces intimately contacting the trough essentially continuously. This design enables the conveyor trough to be kept clean, without risking any appreciable increase in wear, since the loads are distributed over a larger bearing surface. This device will have a longer life because of better load distribution, which is particularly important for plastic.

Now, by rotatably pivoting the flight attachments around the hinge bolt a support surface facing the conveyor trough is provided. Particular advantage arises, however, if the cross piece part comprises two cross pieces, which embrace the corresponding chain link from both sides while connecting the flight attachments with one another and also comprising said support surfaces. In this design, the cross piece facing the trough transmits the moments onto the trough by way of a support surface, while the cross piece turned away from the trough rests with its support surface on the chain link. A stronger connection of the two flight attachments is thus additionally provided.

Since the flight attachments must be produced in large numbers, special care must be taken to keep the unit costs as low as possible. Even though, by onesidedly concentrating upon the problem of friction, proposed solutions generally recommended the use of polyethylene, it turned out surprisingly enough that additional advantages may be achieved by using a different plastic material. Thus, if according to a preferred embodiment flight attachment and cross piece together with their rest and support surfaces are made of polyamide, preferably of molded polyamide, notably of PA 6, the results are not only advantageous frictional conditions, reduced weight and reduced quantities of conveying energy, but also simpler and cheaper production because molding may be used for manufacturing the flight attachments of this material. This method is particularly suited for manufacturing large lots and yields at considerably lower production costs. These advantages may be obtained by using the aforementioned plastic material without regard of the type of design of the flight attachments. In other words, manufacturing the flight attachments of polyamide in any design and shape is particularly advantageous. Admixing $MoS_2$ or graphite further improves the sliding properties of the material, the use of graphite additionally resulting in improved carry-off of electrostatic charges.

BRIEF DESCRIPTION OF THE DRAWINGS

Further details become evident by reference to the following description of embodiments schematically shown in the drawing.

FIGS. 1A and 1B show half of a front view of two embodiments respectively, of a flight attachment having one half of a cross piece connected thereto, the cross piece serving as connector to the neighboring flight attachment (the other halves being mirror image);

FIGS. 2A and 2B show top views of the two embodiments of FIGS. 1A and 1B respectively;

FIGS. 3 and 4 show the corresponding side views;

FIGS. 5-9 illustrate further embodiments of the invention, thus:

FIG. 5 shows a longitudinal section through a conveyor trough;

FIG. 6 shows a longitudinal section through the conveyor trough and the flight attachment;

FIG. 7 shows a partial axonometric view of a vertical conveyor;

FIG. 8 shows a section along the plane VIII—VIII of FIG. 9; and

FIG. 9 shows a top view of an embodiment of a vertical conveyor;

FIGS. 11-16 illustrate further embodiments of the invention, thus:

FIG. 12 shows a perspective view of a preferred embodiment of a conveyor;

FIG. 13 shows a perspective view from the other side of the conveyor in FIG. 12 with the conveyor in a trough and with the approximate center of gravity of the conveyor and load (not shown) indicated by a broken line;

FIG. 14 shows a top plan view of a further preferred embodiment of a vertical conveyor;

FIG. 15 shows a side plan view of the subject in FIG. 12; and

FIG. 16 shows a side plan view like FIG. 13 except rotated 90 degrees.

DETAILED DESCRIPTION OF THE INVENTION

Figure 6:
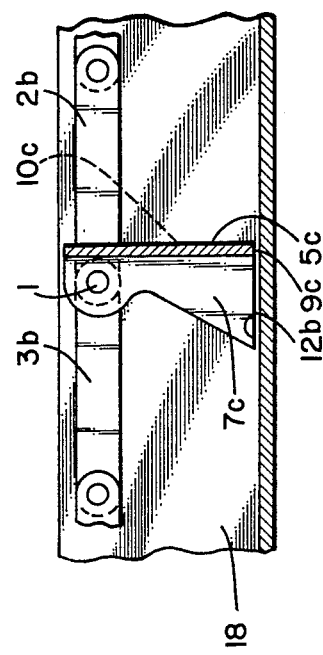

FIGS. 1 and 2 show two chain links 2, 3 only partially indicated by dash-dotted lines and connected with each other by way of a hinge bolt 1. Each side of a vertical central plane 4 shows a different design of a flight attachment. On the right side of FIGS. 1 and 2 the flight attachment arm 5 lags positionally behind, whereas the flight attachment 5a shown on the left side positionally leads with respect to the conveying direction (see arrow 6 in FIG. 2) and the hinge bolt 1. FIG. 1 shows a bearing block 7 connected with the flight attachment arm 5 in front view, and a corresponding bearing block 7a of the flight attachment arm 5a in dotted lines. Both bearing blocks 7, 7a provided with a bore 8 each (see FIGS. 3 and 4) for receiving the hinge bolt 1. This hinge bolt 1 connects both the chain links 2, 3 and the flight attachments 5 or 5a, as the case may be, so that a fixed connection of the flight attachment arms 5 or 5a is achieved without any weakening of the chain links 2, 3 occuring as a result.

The flight attachment arms 5, 5a both have on their underside a rest surface each 9 or 9a, intimately engaging the trough of rectangular cross section protruding underneath the chain links 2, 3 in the direciton of the corresponding opposite flight attachment arm to form a connecting cross piece. The torsional moments and stresses arising with this design when loads act upon the flight attachment arms 5, 5a need not be resisted by the bearing blocks 7 or 7a alone, but are in part taken over by the cross piece 10 or 10a and distributed and partially compensated for.

As shown in FIG. 3, forces may be acting on the flight attachment arm 5a in the direction of the arrow 11, depending on the slope of the conveyor. These forces produce a rotational moment since the flight attachment arm is only pivotably connected. Now, in order to prevent this rotational moment from tipping the flight attachment arm 5a, a support surface 12 is provided for resisting these rotational moments and the compression force 11a produced by them. This support surface is located toward the chain in relation to the cross piece 10 connecting the flight attachment arms 5a and in the plane thereof. The embodiment of FIG. 3 has said support surface 12 formed by the bottom surface of the bearing blocks 7a, on the one hand, and by an extension 10' of the cross piece 10, on the other. The provision of this extension 10' causes the specific bearing pressure to become smaller.

In order to assure a versatile use of the flight attachments, it is of advantage to have the axis 1a of the hinge bolt lie either in the plane of the center of gravity of the load conveyed and acting ont he flight attachment arms 5, 5a or (as in the case of FIG. 3) slightly above this center of gravity plane S, and disposed at about half of the height of the flight attachment arm 5a. Arranging the axis 1a slightly above the center of gravity plane S will keep the rotating moments due to the forces 11 within limits and any wear due to compression forces 11a acting upon the support surface 12 low. On the other hand, an axis 1a positioned too much above the center of gravity plane S would increase the danger of tipping in the other direction. If the design of the conveyor in question is such to make this likely to happen, it may be advisable according to FIG. 4 to arrange the support surface 12 to be positioned in conveying direction (see arrow 6) ahead of the flight attachment arm 5. Generally, however, the preferred design will be that shown ont he left side of FIGS. 1 and 2 and in FIG. 3. Arranging the pivot axis at about ⅔ of the height of the flight attachment has proven advantageous.

One of several rods 13 may be provided for reinforcing the flight attachment arms. They, however, should preferably not extend over the entire length of the flight attachment arm 5a, as shown in FIG. 2. The flight attachment arm 5a may thus be provided with a certain amount of elasticity, especially in its end regions. It may, therefore, be of advantage to have the rib 13 extend over less than half of its length, preferably over ⅓ thereof. This rib, no matter how far it extends over the length of the flight attachment arm 5a fulfills an additional function if its rib surface 14 is in alignment with the rest surface 9a, or with the support surface 12 too. It provides for distributing the forces acting on the rest and support surface over large areas. Contrary to the arrangement shown in FIG. 3, it may be of advantage to have the forward edge 115 of this rib not rounded but wedge-shaped and having an apex in the region of the rib surface 14. This applies to a case in which the conveying direction is opposite to the arrow 6 of FIG. 3. The conveyed material is thus prevented from getting underneath the rib 13 and from lifting the flight attachment arm 5a from its rest surface 9a. However, this problem may be circumvented by having the rib 13 disposed on the backside (in relation to the conveying direction shown by arrow 6) of the flight attachment arm, as shown in FIG. 3.

Applying a lubricant, such as $MoS_2$ or graphite, will improve sliding properties at least in the region of the surfaces 9a, 12 and 14 of the flight attachment body, if it consists of a synthetic plastic, such as polyamide, preferably moldery polyamide, notably PA 6. Graphite applied as lubricant will also help carry off static electricity. If manufacture is done by molding, it may be of advantage to distribute said lubricant throughout the entire plastic body. This will simplify the fabrication process. However, other methods of production, such as sintering, are thinkable, that make it easier to apply the lubricant only on surfaces coming in contact with the trough (e.g., on the outer edges of the flight attachment arms 5b or 5a). It is similarly thinkable to apply layers of the described material to the corresponding surfaces of the flight attachment bodies as separate parts, e.g., by way of dowel pin or dovetail connections, and to strengthen these connections by subsequent sintering, if required. It should be pointed out, however, that production by molding is preferred if the flight attachments are required to be made in large lots.

Figure 5:
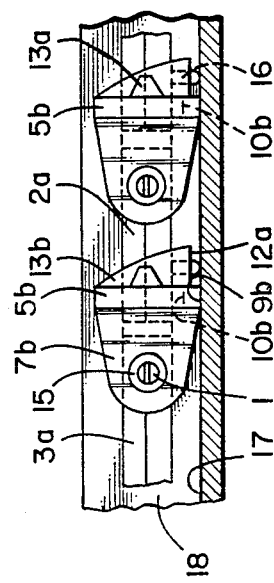

The invention is not limited in any way to use with the type of chain shown in FIG. 2, but may be used with all chains having chain links held together by means of hinge bolts. This should become clear from FIGS. 5 and 6; FIG. 5 shows a type of chain link similar to that disclosed in Swiss Pat. No. 434,107. The bearing bushings 15 protrude far beyond the plane of the chain links 2a, 3a so as to be engaged by the drive wheels. Accordingly, the bores of the bearing blocks 7a are chosen to be as large as to let the bearing bushing 15 pass through. A transverse rib 13a and a longitudinal rib 13b are provided on the backside of each flight attachment arm 5b. The longitudinal rib 13b carries on its bottom side a replaceable insert 16 provided with a support surface 12a. This insert 16, if worn down, may be readily replaced and may be provided alone with lubricant, to the exclusion of other parts of the flight attachment body, which may be manufactured without such lubricant. However, since the rest surface 9b may, on occasion, come in contact with the bottom surface 17 of the trough 18, using lubricant for the flight attachment too may prove of advantage.

FIG. 6 shows the use of another type of chain having links 2b, 3b held together by means of a hinge bolt 1, and also another design of a flight attachment arm 5c. Because of its lever-shaped design in relation to the hinge bolt, this flight attachment arm 5c must be secured in particular against a tipping movement. For this purpose, the bearing blocks 7c formed near the walls of the trough 18 are provided with relatively large support surfaces 12b. In case two flight attachments 5c disposed on the two sides of the chain 2b, 3b are provided, the cross piece 10c connecting them may be made relatively wide, as shown in dotted lines (top edge of the cross piece), that adequate stability is achieved.

Figure 7:
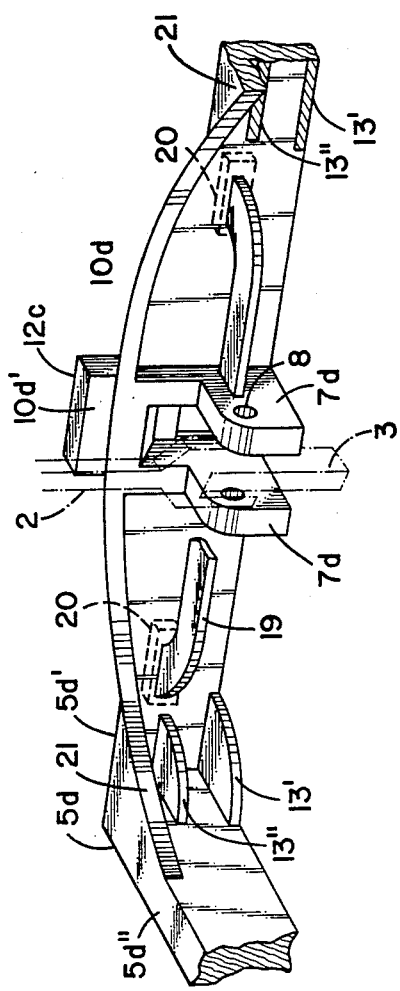

In the vertical conveyor of FIG. 7, the flight attachments 5d comprise on both sides at least one transverse arm 5d'' each, in addition to the arm 5d' spaced laterally from the chain 2, 3 and facing the trough. In this case, the design must be renforced due to the particularly large bending moments arising. Even though FIG. 7 shows a rather short cross piece 10d, this cross piece may be to advantage be made long enough to make it extend over the entire height of the arm 5d' or even beyond, if required. In all cases, however, the cross piece 10d is provided with an upward projection 10d' comprising the support surface 12c. A similar projection, not shown in the drawing, may be provided to advantage on the lower side of the arm 5 and arranged to be equipped there with another support surface.

Several schemes may be used for reinforcement, alternatively or cumulatively. Thus, two reinforcing ribs 13' and 13'' are shown in the connection zone of the two arms 5d', 5d''. An arch-shaped glass fiber body 19 may be provided, having its ends rigidly connected to anchor blocks 20, for example by sintering, and the anchor blocks 20 inserted into the arm 5d' and cast in place, for example. The arch-shaped reinforcing glass fiber body 19 may then rest advantageously on the bearing block 7d.

FIG. 7 shows a dome-shaped reinforcing part 21, which in turn may be reinforced with glass fibers or the like. This part 21 is arranged to extend forward toward the lateral arms 5d'', so as to better resist the bending moments of the latter, whereas it is cut out toward the center.

FIGS. 8, 9 and 11–13 show reference numerals similar to the reference numerals used in the previous figures for parts having analogous functions, except that the number 100 was added to each such reference numeral. Therefore, when describing said parts reference can and will be made to pertinent information given above.

The most conspicuous difference of the embodiments of FIGS. 8, 9 and 11–13 as compared to the previously described embodiments consists in that by fixedly mounting the flight attachments 105, 105a relative to the chain link 2 by means of the hinge bolt inserted into the bearing block bores 8, the moment M arising in operation is resisted not only by the rest surface 9 which is off-set by the hinge bolt in relation to a plane E and which may play at the same time the role of the support surface 12, but that in addition to the cross piece 110 carrying this surface 12 an additional cross piece 210 is provided on the side remote from the conveyor trough, which cross piece 210 may rest directly on the chain link 2 by way of a support surface 112. The moment M will thus be resisted by one or both of the support surfaces 12, 112, depending on the respective distances.

Figure 12:
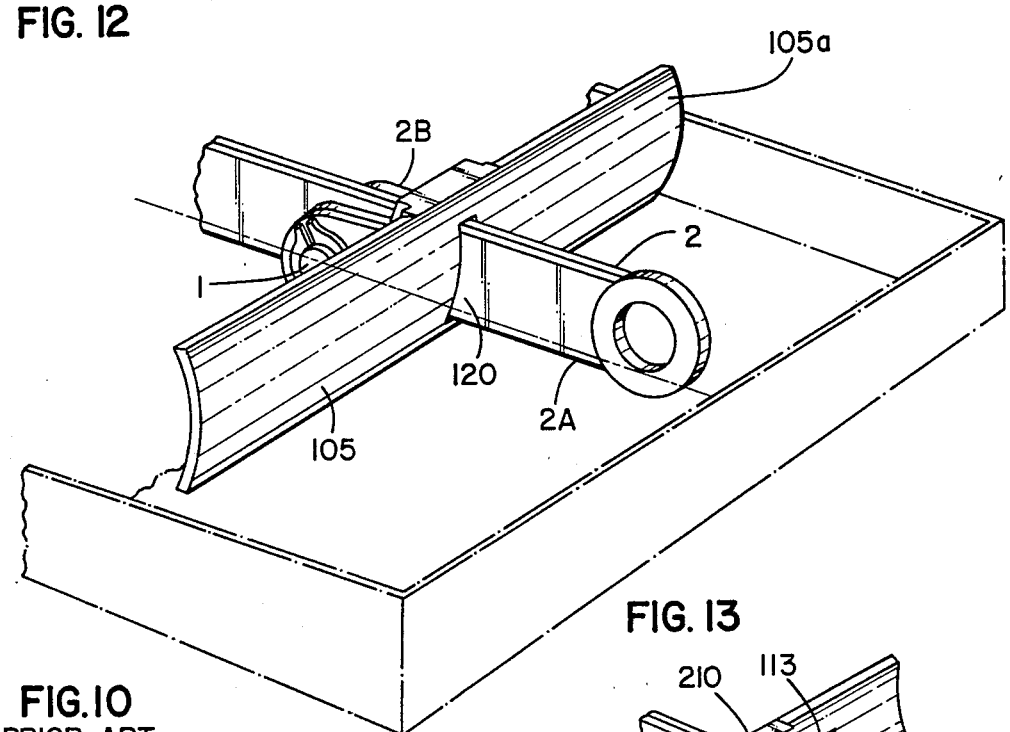
Figure 13:
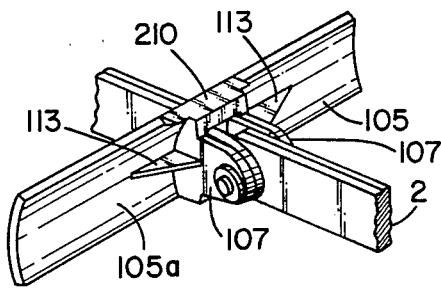
Figure 11A:
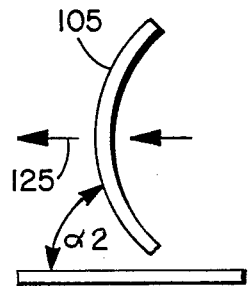
FIG. 11A shows a schematic sectional view of a preferred embodiment shown in FIGS. 12 and 13.
Figure 11B:
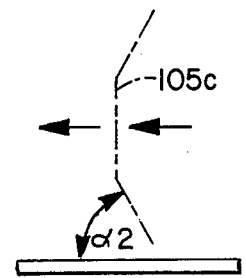
FIGS. 11B and 11C show schematic sectional views of other profiles similar to FIG. 11A.
Figure 11C:
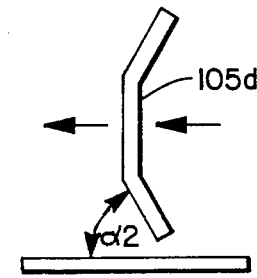

The embodiment in FIGS. 11–13 differs from FIGS. 8 and 9 essentially in that the arms 105, 105a are curved, in a convex shape in the direction of movement of the chain. The curvature is used to increase the strength of the attachment and reduce vibration by virtue of increased rigidity which results in a lower noise level.

FIG. 11 illustrates in schematic form the curvature of the blade 105 and arrow 125 which illustrates the preferred direction of travel.

Figure 10:
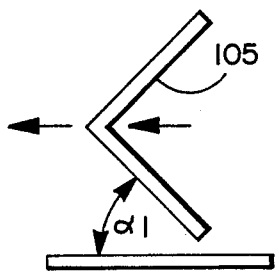
FIG. 10 shows a schematic sectional view of a prior art device.

FIG. 10 illustrates a prior art device (which is prior only to subject matter in FIGS. 12 and 13) which proposed an alternative solution to that of FIG. 9. The device in FIG. 10 had a leading edge of angle alpha 1 ($\alpha$) which is greater than 80°. This device in FIG. 10 was chosen to reduce vibration and increase strength but had the negative effect that it tended to "plow" the material rather than convey it by the "en masse" principle. Moreover, the material would tend to lift the flight from the trough and thereby inhibit its operation. The improvement in FIG. 11 provides a short inclined surface indicated by the angle alpha 2 ($\alpha_2$) with the main portion that is generally perpendicular to the trough 127. In the preferred embodiment, the curvature of blade 105 is symmetric from the lower edge in the trough to the upper edge to form a backward inclined upper edge, and alpha 2 ($\alpha_2$) is preferably between 70°–80°, and in particular 75°. Although it would be possible to provide a flat inclined edge surface angled to a likewise flat main portion, it has been determined that the curved profile of the embodiment in FIG. 11 tends to avoid residual tensions in the plastic material and provides higher strength. Broken line 105c illustrates three tangent lines which make up the curved surface 105. This construction could also be used as an alternative flight, as shown as 105d in FIG. 11.

Of course, this curvature may likewise be applied to the embodiments in prior figures, such as arms 5 and 5a, where convex surfaces may be arranged in several apparent combinations.

In actual practice, the flight attachments 105, 105a are mounted as follows: The narrow shaft portion 24 of the chain link 2 is inserted through the slot 120 provided between the cross pieces 110, 210, until these cross pieces 110, 210 together with the two bearing blocks 107 enclose the fork or body part 2B of the chain link, as is visible fromt he dash-dotted illustration of the chain link 2 in FIG. 8. In this position, the final mounting of the flight attachments 105, 105a only requires the hinge bolt to be inserted through the aligned bearing bores of the bearing blocks 107 and through the corresponding eye of the chain link. It is evident that this design yields not only improved ways to resist the moments acting on the flight attachments, but in addition it provides a more stable construction through the double connection of the flight attachments 105 and 105a and through enclosing the fork part of the chain line 2. Under these circumstances the rib 113 does not have to be moved into the lower region to increase the support surface, but may be left in the central region as shown. However, two or more ribs may be distributed over the height of the flight attachments, if desired, one of these ribs being provided for increasing the support surface 12, if required.

Figure 14:
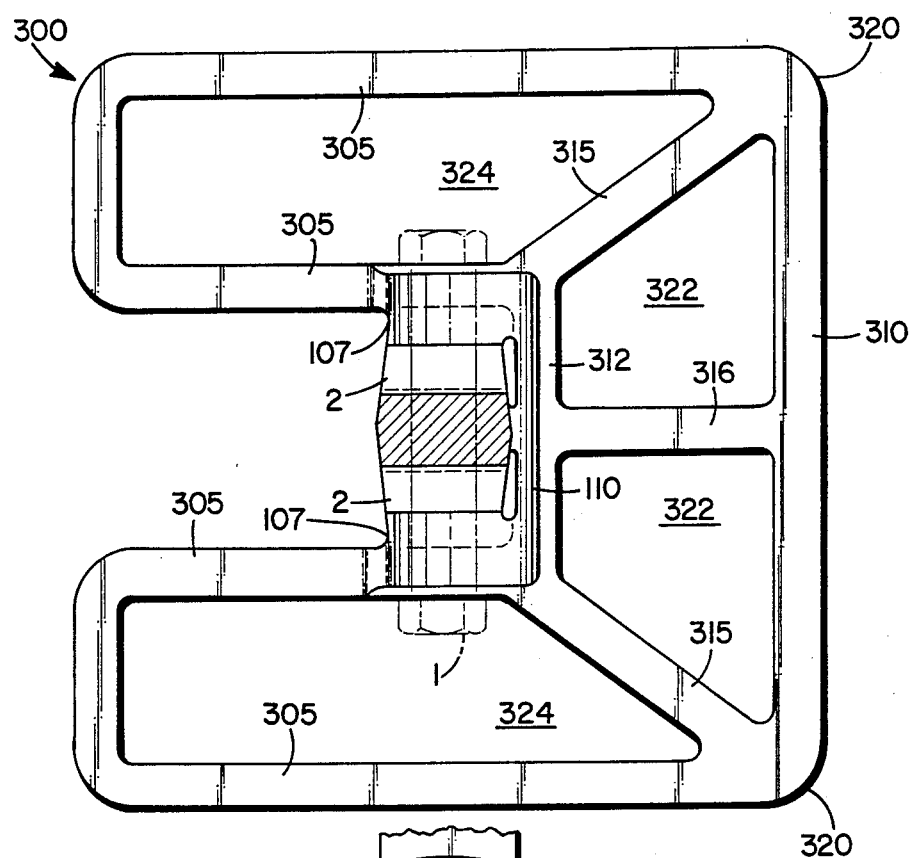
Figure 15:
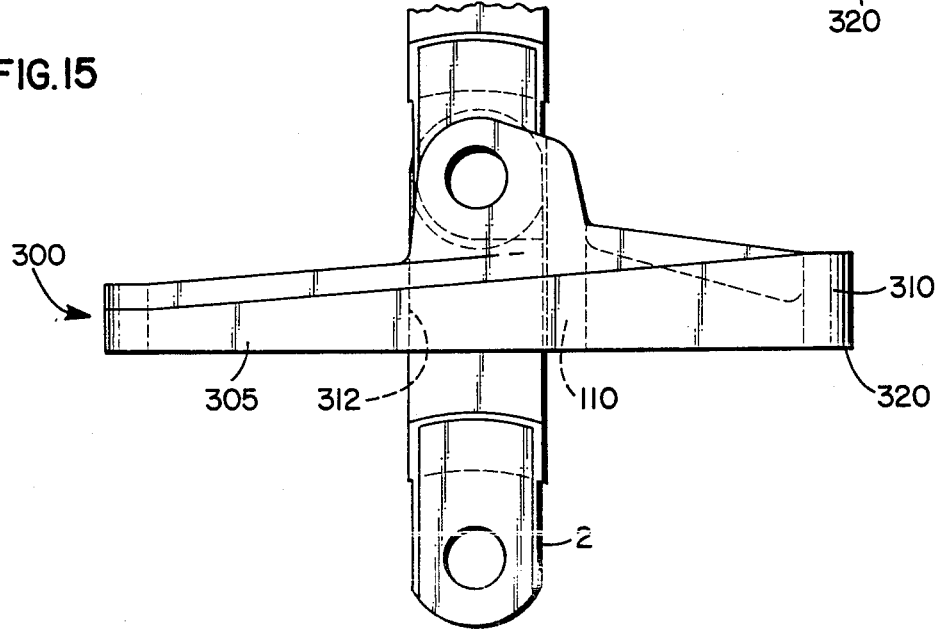
Figure 16:
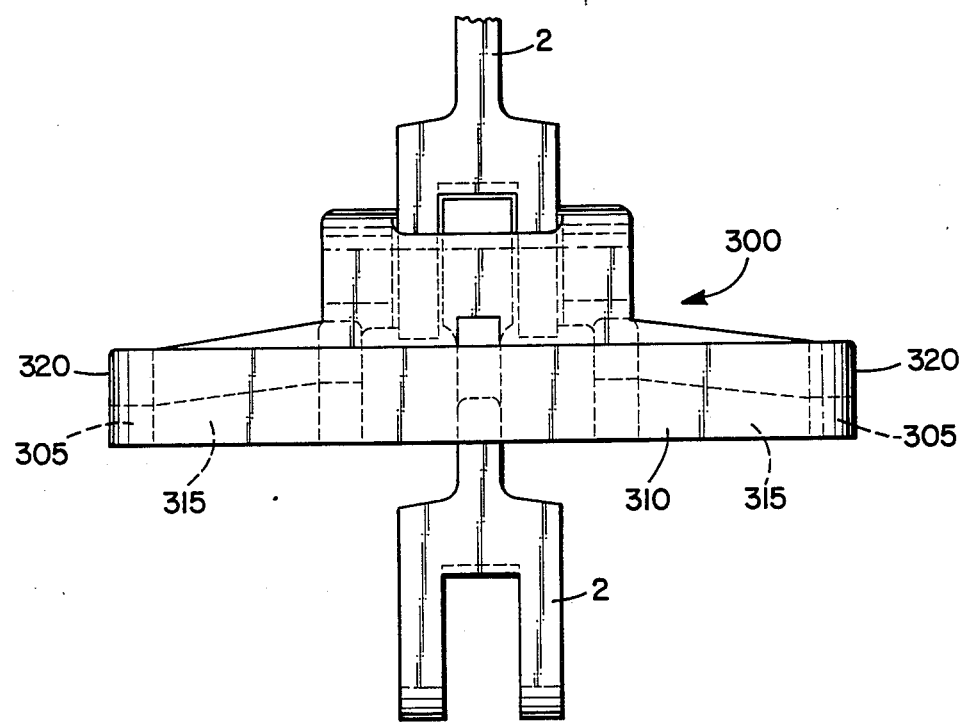

An alternate embodiment is shown in FIGS. 14–16 which is intended primarily as an inclined or vertical conveyor. It is similar to the embodiment of FIG. 9 with respect to its mounting on a chain and, to that extent, similar elements have the same reference numerals.

Link 2, therefore, slides between bearing blocks 107 and 110 and is held affixed to the flight 300 by pin 1. It will be understood that flights 300 are easily replaceable in the same manner as that for FIGS. 8–9 and 11–13. Extending from bearing blocks 107 are C-shaped arms 305 which intersect intermediate cross member 310 and 312, forming a U-shape along 305 and 310. In addition, diagonal members 315 intersect at two corners and at blocks 107. Finally, an additional cross member 316 extends from member 310 to 312 generally half way therebetween. The entire structure is preferably symmetric about a line drawn through member 316 perpendicular to member 310. In use as an inclined conveyor, member 310 is the rest surface which contacts the trough.

In order to minimize turning moments which act upon the flight, it is preferred that the bearing block 107 is centered within the boundaries of the flight and that the area adjacent thereto and between member 310 (bounded by 315, 312 and 310) include the radial arm members 315 which extend from the corners 320 to the bearing blocks 107.

The size of the openings 322 and 324 may be varied according to the type of material which must be moved. If the material has less of a cohesive or interlocking characteristic, the holes should be made smaller although this would naturally involve greater energy in moving the chain.

Numerous other embodiments are thinkable within the scope of the invention. Thus, for example, it may be considered advisable to provide the rest surface 9 (9a to 9c) only in the region of the cross piece 10, i.e. to interrupt this rest surface in the region of the flight attachments. A design of this kind could be considered particularly suited for vertical conveyors (see FIG. 7). On the other hand, a rest surface 9 intimately engaging the trough may be of advantage because the trough can thus be kept clean. Furthermore, two cross pieces parallel to each other may be provided to enclose the chain link.

We claim:

1. A removable flight attachment for a flight conveyor for feeding a load of material in a predetermined moving direction through at trough of predetermined width, a series of chain links each interconnected by a hinge bolt, said links having a narrow shaft portion and a wider body portion, said body portion having two sidewalls and an opening for receiving the next succeeding narrow shaft portion with said body portion and succeeding shaft portion being joined by said hinge bolt passing through aligned apertures therein, said removable attachment comprising:

a flight attachment adapted to receive at least selected ones of said chain links, said flight attachment forming lateral protrusions of predetermined length on each side of the respective chain link and including:

a rest surface on said protrusion for engaging said conveying trough and bridging said chain link, a cross piece bridging the respective chain link and interconnecting both protrusions of the flight attachment, a bearing block on each lateral side of the respective chain link, said bearing blocks being connected to said cross piece and said rest surface, said bearing blocks, rest surface, and cross piece together defining an enclosing frame for receiving said body portion of a link and a slot sized to receive said narrow shaft portion but to prevent passage of said body portion, a bore in each one of said bearing blocks for receiving said hinge bolt, said bores being in alignment with each other and said aligned apertures, wherein each of said protrusions include a first inclined edge portion facing said trough and being forwardly inclined in said moving direction at a predetermined angle relative to said trough, and a main portion extending substantially perpendicular to said trough, said edge portion and said main portion having an edge-free transition to form a curved shape, said rest surface continuously engaging said trough substantially across its entire width, and at least one support surface on said flight attachment spaced from said rest surface longitudinally along the trough in order to absorb any moment acting on said flight attachment.

2. A chain as claimed in claim 1 wherein said hinge bolt means are arranged at least at the height of the center of gravity of the load acting onto said flight attachment in order to diminish the forces acting onto said at least one support surface.

3. A chain as claimed in claim 1 wherein said hinge bolt means are substantially arranged at two-thirds of the height of said flight attachment measured normally to the plane of the chain link and said protrusions.

4. A chain as claimed in claim 1 wherein said cross piece has an extension forming at least a portion of said support surface.

5. A chain as claimed in claim 1 wherein the length of said protrusions corresponds substantially to the width of said conveying trough.

6. A flight attachment as claimed in claim 1 wherein said flight attachment including said cross piece and said rest and support surfaces is made of polyamide.

7. A flight attachment as claimed in claim 1 wherein the flight attachment is made of a moldable polyamide.

8. A flight attachment as claimed in claim 1 wherein the flight attachment is made of polyamide 6.

9. A flight attachment as claimed in claim 1 made of plastic material having an addition of a lubricant at least at said rest and support surfaces.

10. A flight attachment as claimed in claim 9 wherein said lubricant contains $MoS_2$.

* * * * *